United States Patent
Perrine et al.

(10) Patent No.: US 6,833,186 B2
(45) Date of Patent: Dec. 21, 2004

(54) MINERAL-FILLED COATINGS HAVING ENHANCED ABRASION RESISTANCE AND WEAR CLARITY AND METHODS FOR USING THE SAME

(75) Inventors: M. Lisa Perrine, Allison Park, PA (US); Roy E. Dean, Lower Burrell, PA (US); William B. Gansman, Colfax, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 89 days.

(21) Appl. No.: 10/272,704

(22) Filed: Oct. 17, 2002

(65) Prior Publication Data

US 2003/0194550 A1 Oct. 16, 2003

Related U.S. Application Data

(63) Continuation-in-part of application No. 10/120,217, filed on Apr. 10, 2002.

(51) Int. Cl.$^7$ ................................................. B32B 5/16
(52) U.S. Cl. ...................... 428/329; 428/332; 428/447; 428/331; 428/480
(58) Field of Search ................................ 428/329, 332, 428/447, 331, 480, 910

(56) References Cited

U.S. PATENT DOCUMENTS

| | | | |
|---|---|---|---|
| 4,029,632 A | 6/1977 | Gross et al. | |
| 4,255,480 A * | 3/1981 | Scher et al. | 428/208 |
| 4,442,240 A | 4/1984 | Suh | |
| 4,482,656 A | 11/1984 | Nguyen et al. | |
| 5,078,596 A | 1/1992 | Carberry et al. | |
| 5,266,384 A | 11/1993 | O'Dell et al. | |
| 5,401,560 A | 3/1995 | Williams | |
| 5,718,971 A * | 2/1998 | Lee et al. | 428/329 |
| 6,218,001 B1 | 4/2001 | Chen et al. | |
| 6,228,433 B1 | 5/2001 | Witt | |
| 6,228,463 B1 | 5/2001 | Chen et al. | |
| 6,291,078 B1 | 9/2001 | Chen et al. | |
| 6,399,670 B1 * | 6/2002 | MacQueen et al. | 522/64 |

FOREIGN PATENT DOCUMENTS

| | | |
|---|---|---|
| DE | 4426831 | 2/1996 |
| JP | 55-33475 | 3/1980 |
| JP | 63043976 | 2/1988 |
| JP | 7195625 | 8/1995 |
| WO | WO99/57205 | 11/1999 |
| WO | WO01/04226 | 1/2001 |

OTHER PUBLICATIONS

U.S. patent application Publication No. 2003/0017269 byJohn Schierlmann, Jan. 2003.

* cited by examiner

Primary Examiner—Leszek Kiliman
(74) Attorney, Agent, or Firm—Diane R. Meyers

(57) ABSTRACT

An abrasion resistant coating composition having excellent wear clarity is disclosed. The coating composition comprises a unique blend of particles, including alumina that has been treated with an organosilane and silica that is either similarly treated or left untreated. The use of these particles in combination allows for a significant reduction in the weight percent of wear resistant particles that can impart a suitable level of abrasion resistance to a coating. The particles can be included, for example, in a urethane acrylate binder that can be cured using UV radiation. Methods for using these coatings are also disclosed.

21 Claims, 4 Drawing Sheets

MINERAL-FILLED COATINGS HAVING ENHANCED ABRASION RESISTANCE AND WEAR CLARITY AND METHODS FOR USING THE SAME

CROSS REFERENCE TO RELATED APPLICATIONS

This application is a continuation-in-part of Ser. No. 10/120,217, filed Apr. 10, 2002, the contents of which are incorporated by reference herein.

FIELD OF THE INVENTION

The present invention relates to coating compositions that provide enhanced abrasion resistance and wear clarity, and methods for using the same. More specifically, the improved abrasion resistance and wear clarity is achieved by adding a combination of alumina and silica to a coating.

BACKGROUND OF THE INVENTION

Floor coverings, such as wood and vinyl flooring, are subject to wear from foot traffic and contact with heavy objects. As such, abrasion resistance is a particularly desired property in a floor covering. Resistance to contamination or staining caused by a variety of sources is also desirable. To provide these desired characteristics, one or more layers of sealers and/or topcoats are typically applied to the flooring. For example, an abrasion resistant layer having hard particles that impart abrasion resistance can be applied. Often, when this layer and particles experience wear, a whitening or clouding of the layer occurs. Thus, abrasion resistant layers having improved wear clarity are desired.

SUMMARY OF THE INVENTION

The present invention is directed to coating compositions generally comprising a combination of alumina and silica. The alumina has been treated or modified with an organosilane, as further described herein; the silica can be modified or unmodified. The particles are typically dispersed in a coating material suitable for use with flooring.

It has been surprisingly discovered that use of the combination of particles described herein provides a coating having an abrasion resistance typically only seen with coatings in which much higher levels of particles are added. "Wear resistance" and "abrasion resistance", used interchangeably herein, refer to the ability of a material to resist displacement upon exposure to relative motion against hard particles or protuberances. Displacement is usually observed visually, as a removal of the coating material thereby exposing the underlying surface. Wear resistance can be determined through a variety of tests known in the art, such as a Taber abrasion test, a Gardner scrubber test, a falling sand test and the like. It has been further discovered that the present compositions have excellent wear clarity. That such wear clarity can be achieved without sacrificing abrasion resistance is a surprising result.

A number of advantages are offered by the present coatings. Because the weight percent of filler can be dramatically decreased, the coatings that result from the present compositions have much less haze than coatings having higher weight percents of particles. This clarity is maintained even as the layer wears. This is particularly relevant for wood floor coatings, in which visibility of the natural grain of the wood is desired. In addition, because less of the formulation is comprised of mineral particles, greater amounts of other performance enhancing components can be added to the coating. For example, more binder can be added to give the cured film enhanced gouge resistance, enhanced adhesion, and the like; more additives contributing to desirable wet coating properties, such as viscosity and flow characteristics, can also be added. All of this is accomplished without sacrificing the abrasion resistance of the coatings.

DETAILED DESCRIPTION OF THE INVENTION

Figure 1:
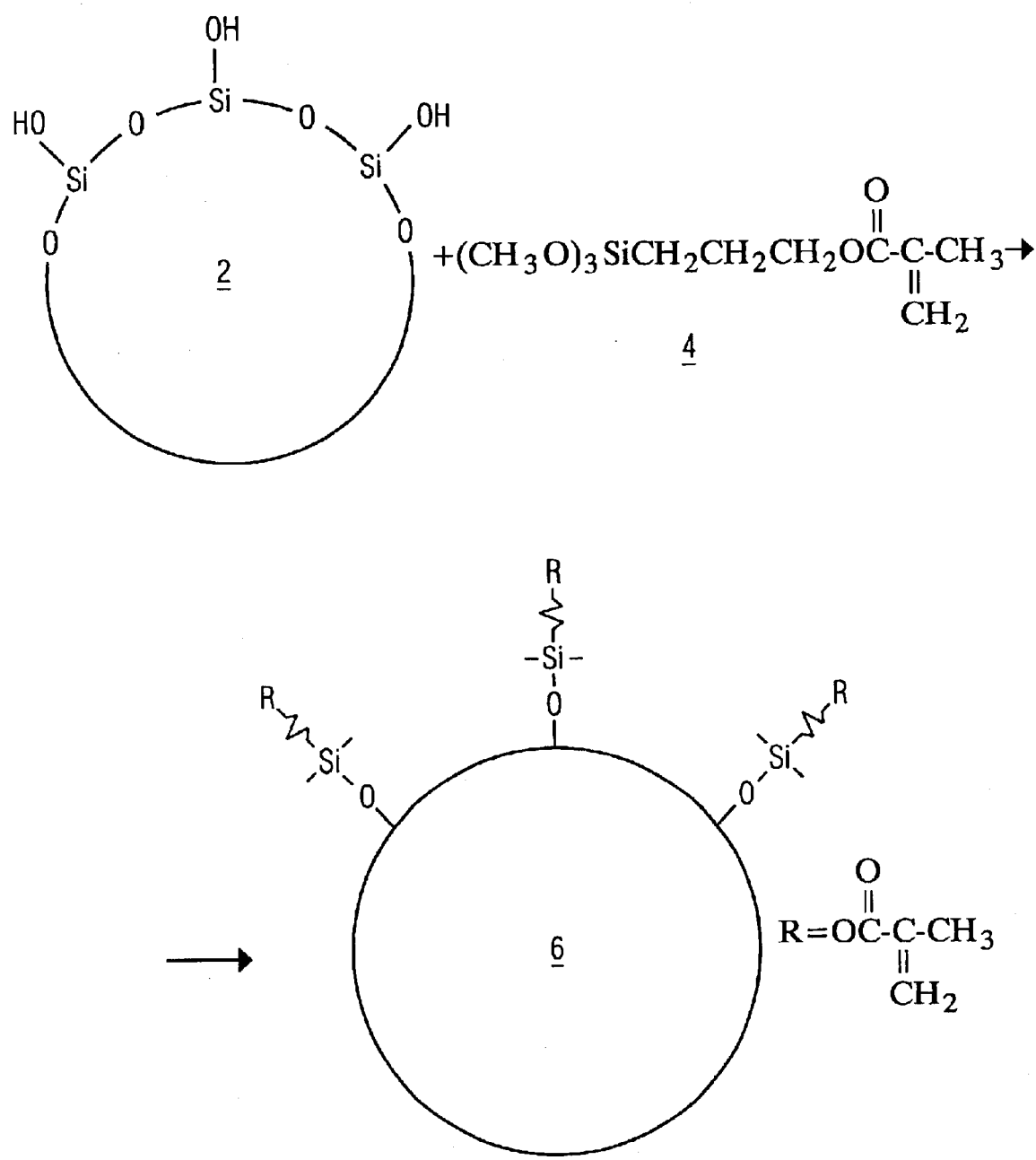
FIG. 1 illustrates the modification of a silica particle with 3-(trimethoxysilyl)propyl methacrylate.

The present invention is directed to a coating composition comprising a binder and a mixture of modified alumina and either modified or unmodified silica. Modification is effected through the use of a silane, discussed further below.

Aluminum oxide ("alumina") can be used in any of its forms, such as alpha, beta, gamma, delta, pheta, tabular alumina, and the like and can be fused or calcined. Alpha alumina is particularly suitable. The average particle size of the alumina will typically range between about 1 and 40 microns. In one embodiment, the average particle size is between 17 and 25 microns, and in another embodiment is about 3 microns. Typically, the average particle size of the alumina will be about the same as the thickness of the coating layer deposited from the coating composition to which it is added. Sol-gel processed aluminas, such as those described in WO 00/52105, can also be used.

Suitable alumina products, including those that are silane treated, are widely commercially available. For example, aluminum oxide precision lapping powder is available from Micro Abrasives Corporation in its "WCA" line of products; this alumina is characterized by platelet-shaped particles, each particle being an individual crystallite. The product is available in a number of different average particle sizes. For example, WCA 25 has an average particle size of 17 microns. Tabular alumina is also available from Alcoa as T64-20. DURALUM special white is a fused alumina having a blocky, irregular shape supplied by Washington Mills Electro Minerals Company, and also comes in a variety of sizes including DURALUM 320 (average particle size 29 microns), DURALUM 400 (average particle size 17 microns), and DURALUM 400SK (average particle size about 18 microns).

Similarly, any kind of silica can be used in the present invention including silica in its crystalline, amorphous, or precipitated form. Highly dispersed amorphous silica is especially suitable, such as various silica products manufactured by Degussa, Germany. This includes ULTRASIL VN3, a precipitated synthetic silica having a surface area of 136 $m^2/g$, a porous surface and an average particle size of about 1 micron, and AEROSIL OX50, a fumed silica having a surface area of 50 $m^2/g$. DK100, an amorphous synthetic silica having a surface area of 100 $m^2/g$, an average particle size of 25 to 30 nanometers ("nm"), and a nonporous surface is also suitable, and is manufactured by Kalush, an experimental plant for the Institute of Surface Chemistry, Ukraine.

These nanoparticulate silicas will typically have an average particle size between approximately 4 and 60 nanometers; an average particle size of about 27 nanometers +/−3 nm is particularly suitable. For the nanoparticles, smaller surface area (i.e. 50 m²/g) is often more suitable, as it will increase viscosity less than nanoparticles having a larger surface area. Micron-sized silica particles ranging from about 1 to 5 microns can also be used according to the present invention, including SYLOID 378 (3 microns average particle size), an amorphous synthetic silica commercially available from Grace Division, W. R. Grace, and GORESIL, a crystalline silica (2 microns average particle size) commercially available from CED Process Minerals, Inc.

Many commercially available alumina and silica products are treated or modified by the manufacturer before being sold. This treatment can include, for example, a silane treatment as generally described below. In one embodiment, the alumina and/or silica used herein are not treated by the manufacturer, but rather are obtained in untreated form and treated as further described below. Particles treated by the supplier can, if desired, be used in addition to or instead of the particles treated as described below.

The alumina, and optionally the silica, used in one embodiment of the present invention is modified or treated with an organosilane compound. Suitable silanes are represented by Formula 1:

wherein R is a hydrocarbon or hetero atom substituted moiety such as an alkyl, substituted alkyl including hetero substituted alkyl moiety having 1 to 30 carbons, such as 1 or 2 carbons. Examples of hetero atoms include oxygen, nitrogen, phosphorous, sulfur, halogens such as chlorine and silicon. R' is an organic substituent that improves the compatibility between the particle and the binder. Compatibility with the binder can be determined, for example, by the clarity of the filled binder; lack of clarity can indicate low compatibility. Compatibility may also be determined by analytical techniques such as scanning electron microscopy; the presence of interstices between the particle and binder indicates less compatibility. Less rapid settling of modified particles as compared to non-modified particles would also indicate greater compatibility. Greater compatibility will also result in Taber abrasion resistance. Samples can be prepared both with modified and non-modified particles and clarity, presence of interstices and/or settling can be evaluated to determine whether the modification has rendered the particles more compatible.

The R' moiety can be functional or nonfunctional, that is, with or without a chemical functional group that may react during the curing process. For example, R' can have vinyl unsaturation such as a (meth)acryloxy group that can react upon exposure to radiation (actinic light or electron beam). Alternatively, R' can lack such a group, such as when an alkyltrialkoxy silane is used. R' is typically a group selected from hydrocarbon and hetero atom substituted hydrocarbon, such as alkyl, substituted alkyl including hetero substituted alkyl. Examples of hetero atoms are oxygen, nitrogen, sulfur, phosphorous, halogens such as chlorine, and silicon. Nonlimiting examples of suitable R' groups include N-(β-aminoethyl)-β-aminoethyl; N-(β-aminoethyl)-γ-aminopropyl; N-(γ-aminopropyl)-γ-aminopropyl; N-(γ-aminopropyl)-β-aminoethyl; methyl; ethyl; propyl; butyl; pentyl; hexyl and other higher alkyls; cyclopentyl; cyclohexyl; alkylated cycloalkyl; vinyl; β-acryloxyethyl; γ-acryloxypropyl; β-methacryloxyethyl; γ-methacryloxypropyl; β-glycidoxyethyl; γ-glycidoxypropyl; β-glycidoxypropyl; and the like.

Suitable silane compounds within Formula 1 are: vinyltrimethoxysilane; vinyltriethoxysilane; vinyl-tris(β-methoxyethoxy)silane; gamma-methacryloxypropyltrimethoxysilane; beta-(3,4-epoxycyclohexyl)-ethyltrimethoxysilane; gamma-glycidoxypropyl-trimethoxysilane; gamma-aminopropyltriethoxysilane; N-beta-(aminoethyl)-gamma-aminopropyltrimethoxysilane; isocyanato-propyltrialkoxysilane; cyanoethyl-trialkoxysilane; 3-(trialkoxysilyl)-methyl ester propanoic acid; trialkoxy[3-(oxiranylalkoxy)propyl]-silane; 2-methyl-3-(trialkoxysilyl) propyl ester 2-propanoic acid; [3-(trialkoxysilyl)propyl] urea; gamma-ureidopropyltriethoxysilane; gamma-chloropropyltrimethoxysilane; gamma-chloropropylmethyltrimethoxysilane; 1,2-ethanediylbis[alkoxydimethyl]silane; dialkoxy-methylphenylsilane; cyanopropyldimethyl-alkoxysilane; chloromethyldimethylalkoxy silane; gamma-mercaptopropyl-trimethoxysilane; N-β-(N-vinylbenzyl-amino)ethyl-γ-aminopropyltrimethoxy-silane monohydrochloride; alkyltriethoxy silanes having 1 to 20 carbons and mixtures thereof. Particularly suitable silane compounds include 3-(trialkoxysilyl)alkyl(meth)acrylates, especially those wherein the alkoxy group has one carbon and the alkyl group has three carbons. "(Meth)acrylate", and variants thereof, is used to refer to both methacrylate and acrylate, which use is conventional in the art.

The silica can be treated with the same silane as the alumina, or can be treated with a different silane within Formula 1. Less haze may be introduced to the composition when the silica particles are treated. Alternatively, the silica can be left untreated for use in the present invention. In addition, silica is often treated by the manufacturer to change the surface characteristics of the silica such as by altering the hydrophobicity, to compatibilize or functionalize the silica (so that it can react with a particular paint binder, for example) or to help control (usually minimize) the viscosity increase seen by adding silica to the coating. Such silicas can also be used according to the present invention.

While it is believed that under certain temperature parameters, described below, the silane actually reacts with the hydroxyl groups on the surface of the particles, the inventors do not wish to be bound by this mechanism. It is possible that some of the silane may be merely forming a coating or partial coating on the particles, such as through chemisorption, rather than reacting with the silanol. "Treatment", "modification" and variants thereof as used herein refer to the interaction between the particles and the silane without regard to the mechanism of this interaction, i.e. reaction, chemisorption or a combination of both. As a result of the treatment of the particles with the silane, the particles become more compatible with the carrier in which they are placed. As such, the present compositions have greater stability and less settling than compositions with particles that do not have the relatively long-chain silane moieties of the present invention.

In a particular embodiment, the silane moiety is selected so as to have one or more functional groups that will react with the carrier or binder into which the particle is placed. For example, the silane can have a (meth)acryloxy group that will react with a radiation curable urethane binder.

The silane-modified particles of the present invention may be prepared by any method known for associating a silane composition with surface metal hydroxide-containing abrasive particles. In one method, the silane compositions may be dissolved in a solvent, such as water, and sprayed onto the surfaces of abrasive particles, which are then dried to produce silane-modified abrasive particles. Once dried, the silane-modified abrasive particles can be incorporated into a dispersion. Alternatively, the modified particles can be prepared by combining the particles with a solvent, such as water, and mechanically dispersing the abrasives in the solvent. Once the abrasive particles are dispersed in the solvent, a silane composition is added to produce silane-modified particles where the silane bonds to the metal hydroxide of the surface of the particle, such as through hydrogen bonding. The modified particles can be separated from the treating solution and dried, or the dispersion can be used directly in the coating composition.

Particularly suitable methods for modifying the particles of the present invention are described in the Example section below. Generally, the silica can be treated by fluidizing the silica in a reactor vented with dry air, heating the silica to a temperature of between about 80° C. and 200° C., such as between about 80° C. and 150° C., or between about 90° C. and 95° C., and adding the silane dropwise. Alumina can be modified through a liquid-phase procedure in which the alumina is suspended in alcohol; the silane is added to the suspension to form a paste, which can be air dried and/or dried with treating. With either the alumina or silica particles, the amount of silane and particle used can range from 0.5 to 10 percent by weight silane to 99.5 to 90 percent by weight particle based on total weight of silane and particle. In one embodiment, greater than 1 percent by weight silane is used; in another embodiment, less than 1 percent is used. In yet another embodiment, the amount of silane used is up to 10 weight percent. Increasing the percent of silane used to modify the alumina particles can improve the wear resistance of the coating in some embodiments, although the same is generally not seen with the silica particles. Typically, the weight ratio of alumina to silane is between about 200 to 1 and 10 to 1, such as about 50 to 1.

Figure 2:
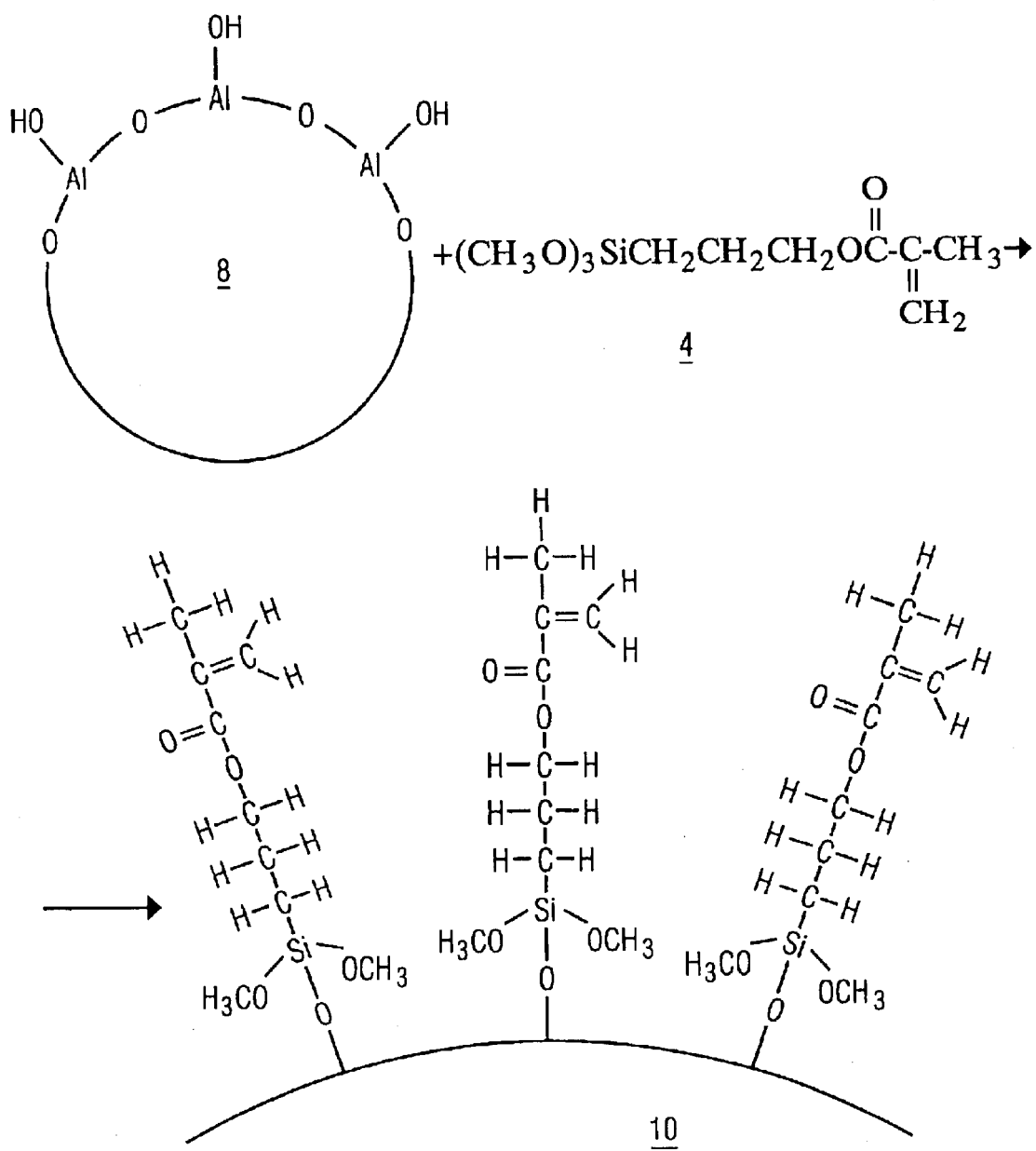
FIG. 2 illustrates the modification of an alumina particle with 3-(trimethoxysilyl)propyl methacrylate.
Figure 3:
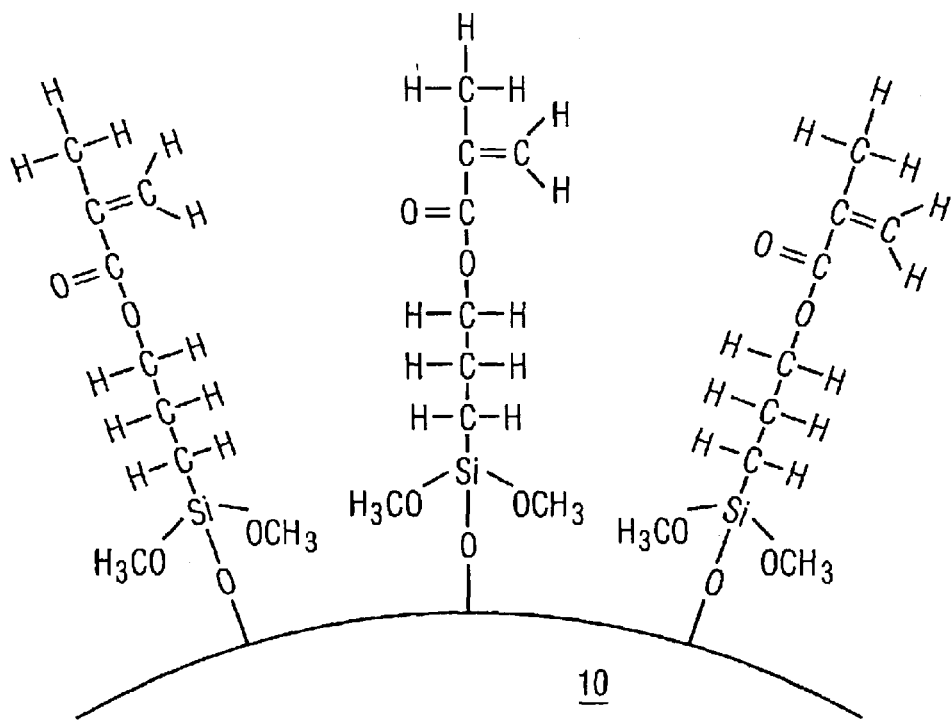
FIG. 3 illustrates the interaction between silane molecules on the surface of a modified alumina particle.
Figure 3:
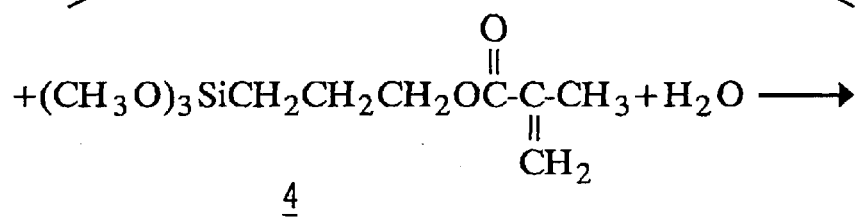
Figure 3:
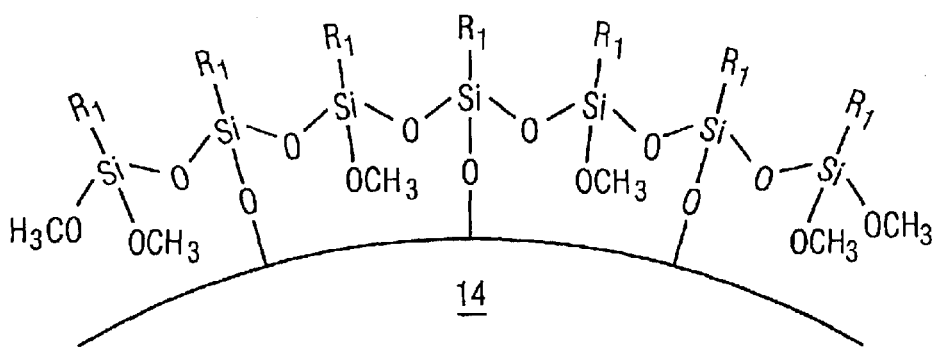
Figure 3:
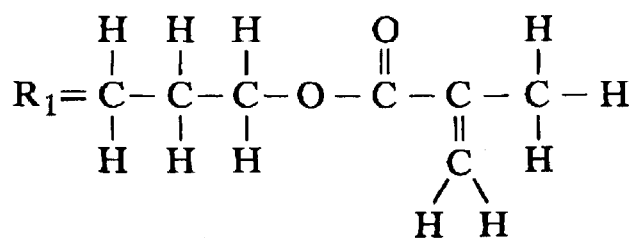

The interaction between the silica and silane is depicted in FIG. 1, wherein silica 2 is treated with 3-(trimethoxysilyl) propylmethacrylate 4 to result in a treated silica particle 6. A similar scheme is depicted in FIG. 2, wherein an alumina particle 8 is treated with 3-(trimethoxysilyl) propylmethacrylate 4 to yield the alumina particles used in the present invention 10. FIG. 3 depicts an alumina particle 10 reacted with additional silane 4 and water to yield particles 14 in which the silane moieties interact with each other. The silanes have (partially) condensed to siloxanes. Trialkoxysilanes hydrolyze in water to give the corresponding silanols. The silanols can then condense to siloxanes.

Figure 4:
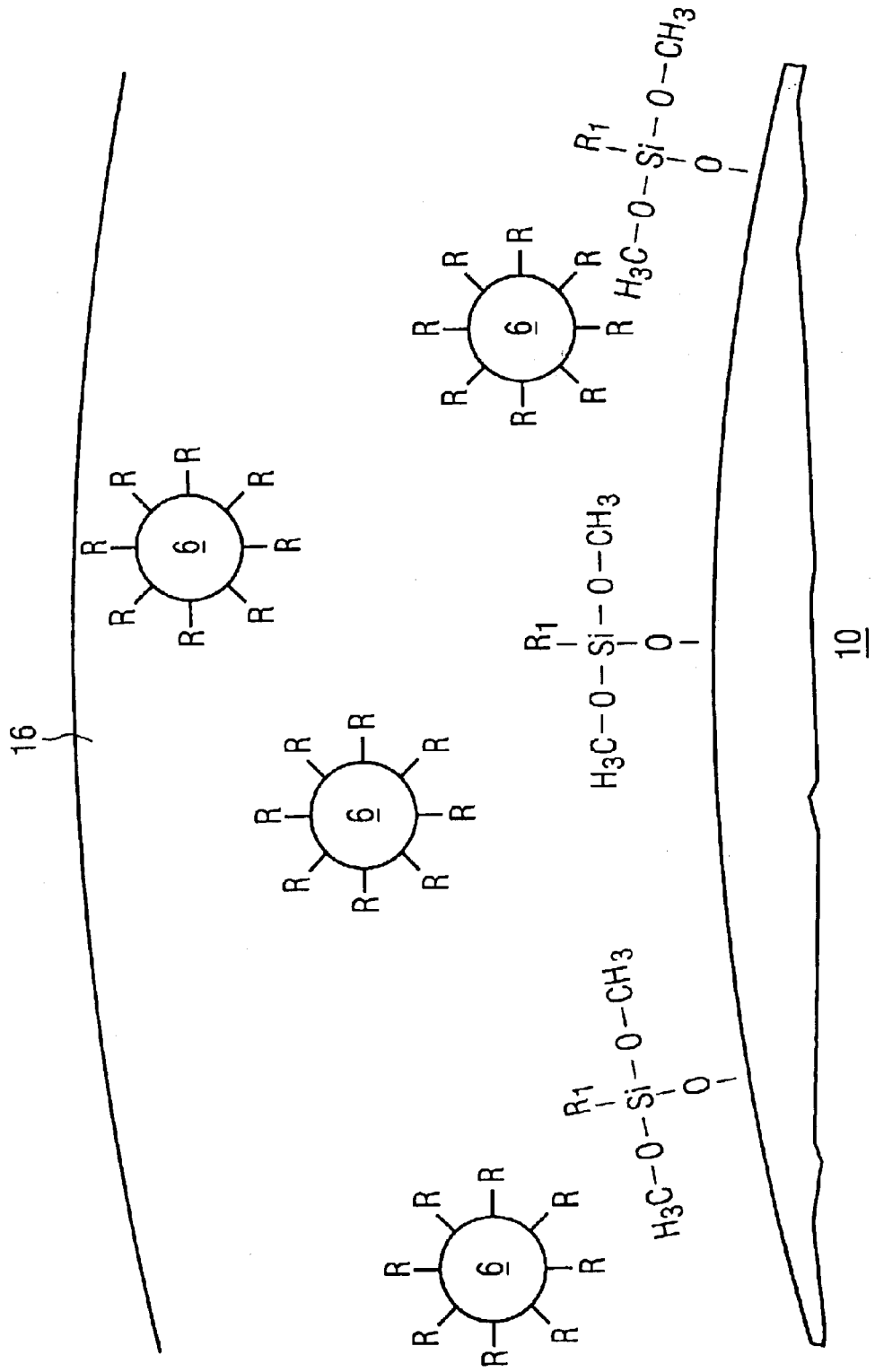
FIG. 4 illustrates the interaction between modified silica particles, a modified alumina particle, and a binder composition.

The coating composition of the present invention, in addition to the particles described above, further includes a binder material typically used in the art for such coatings. Examples include urethanes, acrylics, melamines, polyvinylchlorides, polyolefins, and the like. Urethanes are particularly suitable for use in the present invention, especially those that can undergo radiation curing, such as through exposure to UV radiation or electron beam radiation. As noted above, the silane can be selected so as to interact with the chosen binder; for example, the particles prepared as depicted in FIGS. 1 and 2 will interact with functional groups on a urethane resin. Urethane can be modified with an acrylate or methacrylate functionality, through means standard in the art. This interaction of modified alumina particles 10, modified silica particles 6, and urethane (meth)acrylate 16 is depicted in FIG. 4. A number of other oligomeric binders and functionalities can also be used, as can systems that cure by free radical or cationic cure mechanisms, all of which will be familiar to those skilled in the art.

Thus, in one embodiment of the invention, the coating composition crosslinks upon exposure to ultraviolet radiation to produce a clear film. Any suitable source of ultraviolet light having a wavelength ranging from about 180 to about 400 nanometers may be employed. Particular wavelengths may be especially suitable, depending on the photoinitiator used. Suitable sources of ultraviolet light are widely available and include, for example, mercury arcs, carbon arcs, low pressure mercury lamps, medium pressure lamps, high pressure mercury lamps, swirl-flow plasma arcs and ultraviolet light emitting diodes.

When UV light is used to cure the compositions of the invention, the compositions typically contain from 0.1 to 5.0 percent, based on solids, of a photopolymerization initiator (and/or photopolymerization sensitizer). Photoinitiators and photosensitizers are generally known in the art. Examples of photoinitiators include isobutyl benzoin ether, mixtures of butyl isomers of butyl benzoin ether, $\alpha,\alpha$-diethoxyacetophenone, and $\alpha,\alpha$-dimethoxy-$\alpha$-phenylacetophenone. Examples of photosensitizers include benzophenone, anthraquinone, thioxanthone and phosphine oxides. Other examples of photoinitiators and photosensitizers can be found in U.S. Pat. No. 4,017,652, incorporated by reference herein. UV stabilizers can also be added including benzotriazoles, hydrophenyl triazines and hindered amine light stabilizers, for example those commercially available from Ciba Specialty Chemicals in their TINUVIN line.

Other additives standardly used in the art can also be used in the present compositions. This includes organic solvents such as esters, for example n-butyl acetate, ethyl acetate and isobutyl acetate; ether alcohols, such as ethylene glycol monoethyl ether, ethylene glycol monobutyl ether, propylene glycol monomethyl ether, dipropylene glycol monoethyl ether, propylene glycol monoethylether acetate, ethylene glycol monoethylether acetate, dipropylene glycol monoethylether acetate and diethylene glycol monoethylether acetate; ketones, such as methyl ethyl ketone, methyl n-butyl ketone and methyl isobutyl ketone; lower alkanols containing 2 to 4 carbon atoms, such as ethanol, propanol, isopropanol and butanol; and aromatic hydrocarbons, such as xylene, toluene and naphtha. Other additives can also be used, including rheology modifiers, flow additives, deaerators, gloss control additives, diluents, etc.

It will be appreciated that the present compositions are not limited to those in which a UV curable binder is present. For example, moisture cure urethanes, air drying alkyds, catalyzed alkyds, ambient temperature cure epoxy-amines and hydroxy-isocyanates, heat curable epoxy-acids, hydroxyl-aminoplast as well as other aminoplast curing chemistries, lacquers such as acrylics or polyester lacquers or dispersions can all be used according to the present invention. The binders can be organic solvent based or aqueous based.

An effective amount of the alumina/silica particle combination should be added to the present compositions to impart the desired level of abrasion resistance. This amount can be as high as 35 weight percent of the total weight of the composition. Generally, the higher the concentration of the present particles, the greater the abrasion resistance, although this may not be true for all particle types in all types of systems. Higher concentrations of particles, however, can affect the appearance of the coating. One skilled in the art can determine the appropriate weight percent of particles or "load" to add to the present compositions to get the desired abrasion resistance without compromising appearance. Any amount of particles that improves abrasion resistance is an "effective amount" within the present invention. Typically, the effective amount will be far less than that observed when using conventional fillers, such as unmodified alumina. For example, the present particle combination can be used in an amount of 11 weight percent or less, such as 10.5 weight percent, 7 weight percent, or less. A particularly suitable combination employs about 8 to 5 weight percent or less of alumina and about 4 to 2 weight percent or less of silica. The abrasion resistance of these compositions is comparable to that of coatings having 20 weight percent of unmodified alumina; weight percents are based on total weight of the coatings. In the event that alumina or silica that is not treated according to the present invention is added to the present compositions, such as to provide thickening or viscosity adjustments, the weight percents given above do not include these additives.

In addition to excellent abrasion resistance, the compositions of the present invention have also been found to offer excellent wear clarity. This is particularly true when the alumina particles and silica particles together comprise about 11 weight percent or less of the total composition. "Wear clarity", as used herein, refers to the ability to resist appearance degradation. Wear clarity can be visually observed as whitening, mar, scuffing, gloss loss, scratches, etc. or can be measured using a device such as a hazemeter, gloss meter, or the like. Wear clarity can be assessed, for example, by abrading a surface and observing changes to the coating appearance after abrasion. For example, CS-17 wheels mounted on a standard Taber abraser can be used to abrade the surface of a coated substrate, and then the wear clarity can be assessed visually or measured using some type of meter after so many cycles of abrasion. CS-17 wheels are abrasive wheels available from Teledyne Taber and distributed by Byk-Gardner. The wheels can be loaded with additional weight if desired. Modified ASTM D4060 Standard Test Method for Abrasion Resistance of Organic Coatings by the Taber Abraser can be used. In this test, abrasion clarity is assessed using the following procedure: 4 inch×4 inch pieces are cut from a wood sample and mounted onto specimen holders of a Taber Industries abraser—Model 5150, which automatically counts cycles tested. Abrasion resistance measurements are made using CS-17 wheels. A 1000 gram load is placed on each wheel. The CS-17 strips are reconditioned against S-11 refacing discs for 50 cycles prior to each sample test. The Taber abraser is energized. Abrasive wear clarity is evaluated for the samples after 100 cycles. Wear clarity can be assessed visually or by using a meter that measures appearance, such as a hazemeter.

The present invention is therefore further directed to a coating composition having an average wear clarity of less than 54, such as less than 50. It will be understood that wear clarity can vary slightly from substrate to substrate even when the same coating is used; "average wear clarity" refers to the average wear clarity value of at least two panels coated and tested in the same manner. The wear clarity values provided herein were all determined using CS-17 wheels with a 1000 gram load, 100 cycles, as described above, and are reported as the haze value of the abraded sample as measured using an XL-211 haze meter from Hazeguard Systems, following the manufacturer's instructions. "Abrasive wheel wear testing" therefore refers to use of CS-17 wheels with a 1000 gram load, 100 cycles, as described herein.

The present invention is further directed to a method of imparting abrasion resistance to a substrate such as flooring comprising applying to at least a portion of the substrate the coating composition described herein. The coatings of the present invention can be applied by any conventional means, including spraying, curtain coating, dip padding, roll coating, and brushing. Any substrate can be coated with the present compositions, including, for example, wood flooring, wood veneer, flexible plastic including vinyl flooring, ceramic tile, and the like. Examples of other substrates include metal and rigid plastics such as polycarbonate and polyester and glass. Wood and wood veneer substrates other than flooring can also be treated according to the present invention, such as desks, table tops and the like. To determine whether improved abrasion resistance is obtained from a particular combination of particles, two formulations can be made with the only difference being that one contains the present particle combination and the other does not. The coatings can be tested for abrasion resistance by any means standard in the art, such as those described in the Examples section below. The results from the particle containing and non-particle containing coatings can be compared to determine if improved abrasion resistance is obtained when using the current particles. Even a small improvement in any of these tests constitutes an improvement according to the invention.

It will be appreciated that in the case of wood flooring, a number of different layers may be applied to the flooring, either before or after installation; these layers can include, for example, a stain coating, an abrasion resistant sealer, an adhesion promoter and a topcoat. The particle combination of the present invention most typically is present in the abrasion resistant sealer, although it can appear in any layer. Accordingly, the present invention is further directed to a wood flooring comprising at least one coating layer, wherein the coating layer is formed from the coating composition of the present invention. Typically, such wood flooring will have two or more layers. The total film build of all the layers on the flooring can be about four times or less of the thickness of the mineral-filled layer alone; that is, the present compositions can be applied so as to form a layer that is about 25 percent or less of the total thickness of all coating layers.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. As used herein, the term "polymer" refers to oligomers and both homopolymers and copolymers.

EXAMPLES

The following examples are intended to illustrate the invention, and should not be construed as limiting the invention in any way.

Example 1

Modification of Silica

Various silicas were modified with 3-(trimethoxysilyl) propylmethacrylate ("SiMAC"), 3-(trimethoxysilyl) propylacrylate ("SiAC"), methyltriethoxysilane ("MTES") or octyltriethoxysilane ("OTES"). Twenty-five grams of silica were placed into a one liter glass reactor. The reactor was vented with dry air. The silica was agitated at 500 to 600 RPM, which was sufficient to cause the silica to be in a fluidized state. The temperature of the air in the reactor was heated to 90° C. 1.8 grams of SiMAC, SiAC, MTES or OTES were added dropwise at an approximate rate of one to two drops per second. The mixture was held at temperature for two hours. The sample was then cooled. The silicas used were DK100 (Kalush, average particle size of 25 to 30 nm), AEROSIL OX50 (Degussa, average primary particle size 40 nm) and ULTRASIL VN3 (Degussa, average particle size 1 micron).

Example 2

Modification of Alumina

Various samples of alumina were modified with SiMAC, SiAC, MTES or OTES. Fifty grams of alumina was stirred into 30 ml of dried ethanol. Twenty milliliters ("ml") of a 5 percent solution of SiMAC, SiAC, MTES or OTES in ethanol were then added, with stirring. The paste was dried for 12 hours at ambient temperature, and then for 3 hours at 120° C. Dried samples were then ground. The alumina used included DURALUM 400 (Washington Mills, average particle size 17 microns), DURALUM 320 (Washington Mills, average particle size 29 microns), and WCA25 (Micro Abrasives Corporation, average particle size 17 microns, platelet shaped).

Example 3

A base composition ("Coating A") was made using the components and weight percents shown in Table 1. To some samples, as indicated in Tables 2 and 3 below, the modified alumina and either modified or unmodified silica were added; the modified particles were prepared as described in Examples 1 and 2. Alumina was added to Coating A using Cowles blade agitation with sufficient speed to make a vortex; alumina was sifted into the coating with stirring and the blend agitated for several minutes. For those samples in which silica was also added, it was also sifted into the coating and added with stirring, with agitation following for several minutes to disperse the particles in the coating.

TABLE 1

| Description | Weight percent |
| --- | --- |
| Urethane acrylate oligomer[1] | 46.8 |
| Isodecyl acrylate[2] | 8.3 |
| n-Vinyl 2-pyrrolidone[3] | 10.9 |
| Ditrimethylol propane tetraacrylate[4] | 17.9 |
| Tripropylene glycol diacrylate[5] | 11.8 |
| BYK 320[6] | 0.1 |
| Benzophenone[7] | 1.0 |
| DAROCUR 1173[8] | 2.1 |
| CABOSIL M-5[9] | 0.6 |
| Cellulose acetate butyrate 551-0.2[10] | 0.5 |

[1] Aliphatic urethane acrylate oligomer resin.
[2] Isodecyl acrylate, reactive diluent SR395 from Sartomer Company.
[3] n-Vinyl-2-pyrrolidone, reactive diluent V-pyrol/RC from ISP Technologies Inc.
[4] Ditrimethylolpropane tetracrylate, reactive diluent SR355 from Sartomer Company.
[5] Tripropyleneglycol diacrylate, reactive diluent SR306 from Sartomer Company.
[6] Byk-320, silicone additive defoamer from Byk-Chemie USA.
[7] Benzophenone, photosensitizer from Cognis Coatings and Inks.
[8] Darocur 1173, photoinitiator from Ciba Specialty Chemicals Additives.
[9] Cabosil M-5, untreated fumed silica thickener (surface area 200 m$^2$/g, 325 mesh residue < 0.02%) from Cabot Corporation.
[10] Cellulose acetate butyrate 551-0.2, thickener from Eastman Chemical Company.

Mineral-filled coatings were applied to maple veneer boards that had been prepared as follows. C836E35 UV stain (available commercially from PPG Industries, Inc.) was wiped onto a board; excess stain was removed. The stain was flashed at 50° C. to 60° C. for about 5 minutes to remove solvent, and cured by exposure to 300 mJ/cm$^2$ using 80 W/cm medium pressure mercury UV curing lamps (part no. 25-20008-E), available from Western Quartz Products, Inc. Fifteen to 18 microns of C1370Z74 UV coating (available commercially from PPG Industries, Inc.) were then applied using a Dubois roll coater. The coating was cured by exposure to 325 mJ/cm$^2$ using the lamps described above. The coating surface was scuff sanded using a red 3M SCOTCHBRITE pad.

The boards to be coated with the mineral-filled coatings were weighed. Twenty to 25 microns (0.8 to 1.0 mils) of the sample coating was applied using a Dubois roll coater, and the board weighed again. The weight of the sample coating applied was determined, and the film build of coating was calculated, using the following equation:

$$\text{mils applied} = \frac{509.3 \times \text{gram coating applied}}{\text{density of coating} \times \text{length of board coated} \times \text{width of board coated}}$$

The coating was cured by exposure to 535 mJ/cm$^2$ using the lamps described above. Fifteen to 20 microns of R1162Z74 UV coating (commercially available from PPG Industries, Inc.) was applied using a Dubois roll coater, and the coating cured by exposure to 850 mJ/cm$^2$ also using the lamps described above.

Abrasion wear through resistance was tested using the following procedure. 4×4 inch pieces were cut from the wood sample prepared as described above. The pieces were mounted onto specimen holders of a Taber Industries abraser—Model 5150, which automatically counts cycles tested. Abrasion resistance measurements were made using CS-0 wheels covered with S-42 abrasive strips, both available from Taber Industries and Byk-Gardner. A 500-gram load was placed on each wheel. The S-42 strips were new at the start of testing of each sample and were replaced after every 500 cycles. The Taber abraser was energized and the wood surface monitored. The test was complete when the abrasive strip had worn through the coating to initial exposure of bare wood. The number of cycles to wear through is reported in Tables 2 and 3 as the average cycles to wear per mil of coating, and is the average of at least two test specimens.

TABLE 2

| Sample | Alumina | Treatment | % in coating | Silica | Treatment | % in Coating | Abrasion cycles/mil |
| --- | --- | --- | --- | --- | --- | --- | --- |
| 1 | — | — | — | — | — | — | 165 |
| 2 | DURALUM 400 | — | 5 | — | — | — | 220 |
| 3 | DURALUM 400 | SiMAC | 5 | — | — | — | 390 |
| 4 | DURALUM 400 | — | 5 | DK100 | — | 1.7 | 215 |
| 5 | DURALUM 400 | SiMAC | 5 | DK100 | — | 1.7 | 515 |
| 6 | DURALUM 400 | — | 5 | DK100 | SiMAC | 1.7 | 250 |
| 7 | DURALUM 400 | SiMAC | 5 | DK100 | SiMAC | 1.7 | 485 |

As can be seen from the results presented in Table 2, Sample 1 containing neither alumina nor silica gave the worst performance in terms of abrasion resistance. Samples 2, 4 and 6 all utilized unmodified alumina either without silica (Sample 2), with unmodified silica (Sample 4) or with modified silica (Sample 6). The wear resistance of these samples was improved as compared with Sample 1; the performance of Sample 3, which contained only modified alumina, was also improved as compared to Sample 1. Samples 5 and 7, however, which contained modified alumina and either unmodified or modified silica, respectively, had greatly improved results as compared with all other samples. This demonstrates the improvement that is seen when using the combination of particles of the present invention.

TABLE 3

| Sample | Alumina | Treatment | % in coating | Silica | Treatment | % in Coating | Abrasion cycles/mil |
|---|---|---|---|---|---|---|---|
| 8 | DURALUM 400 | SiMAC | 5 | DK100 | SiMAC | 1.7 | 425 |
| 9 | DURALUM 400 | SiAC | 5 | DK100 | SiAC | 1.7 | 400 |
| 10 | DURALUM 400 | SiAC | 5 | OX50[11] | — | 1.7 | 400 |
| 11 | DURALUM 400 | SiMAC | 5 | GORESIL 25[13] | — | 1.7 | 420 |
| 12 | DURALUM 400 | SiMAC | 5 | SYLOID 378[12] | — | 1.7 | 410 |

[11]AEROSIL OX50, fumed silica (surface area 50 m2/g) from Degussa.
[12]SYLOID 378, amorphous synthetic silica (3 microns average particle size) from Grace Division, W. R. Grace.
[13]GORESIL, crystalline silica (2 microns average particle size, largest particle 5 microns) from CED Process Minerals, Inc.

Samples 8 through 12 demonstrate the abrasion resistance for coatings filled with silane-modified alumina and various silicas. The results are fairly uniform regardless of the silica being treated (Samples 8 and 9) or untreated (Samples 10 to 12), nanoparticulate (Samples 8 to 10) or micron sized (Samples 11 and 12).

Example 4

A base composition ("Coating B") was made using the components and weight percents shown in Table 4. Alumina and silica, when added, were stirred in with a spatula; the coating was then homogenized with the aid of an ultrasound disperser for five minutes. During this procedure, the coating temperature went as high as 50° C. The modified alumina and silica were prepared as described in Examples 1 and 2. Coating C, the components and weight percents for which are also in Table 4, was also prepared and used as described below.

TABLE 4

| Description | Coating B Weight percent | Coating C Weight percent |
|---|---|---|
| Urethane acrylate oligomer | 39.6 | 39.0 |
| Isodecyl acrylate | 10.6 | 15.5 |
| Ethoxyethoxy ethyl acrylate | 1.4 | 1.4 |
| n-Vinyl 2-pyrrolidone | 16.0 | 20.0 |
| Acrylic resin[14] | — | 15.0 |
| Ditrimethylol propane tetraacrylate | 19.4 | — |
| Tripropylene glycol diacrylate | 8.4 | 5.0 |
| BYK 320 | 0.1 | 0.1 |
| Benzophenone | 1.0 | 0.5 |
| DAROCUR 1173 | 2.0 | 2.2 |

TABLE 4-continued

| Description | Coating B Weight percent | Coating C Weight percent |
|---|---|---|
| CABOSIL M-5 | 1.5 | 0.6 |
| Aluminum Oxide C[15] | — | 0.6 |

[14]Acrylic resin, Paraloid DM-55 from Rohm and Haas Company.
[15]Aluminum Oxide C, highly dispersed metallic oxide rheology controller from Degussa.

Maple veneer boards were prepared as generally described in Example 3, only using a high-pressure Hg lamp DRT-400 (with a rated power of 400 W).

Coating C was heated from 35° C. to 40° C. and applied to the boards with a heated applicator to achieve a thickness of about 12 microns. Coating C was cured for 30 seconds using the DRT-400 lamp. Cured Coating C was then scuff sanded with a red SCOTCHBRITE pad. About 25 microns (1 mil) of Coating B was then applied and cured for 30 seconds. A second layer of Coating B was then applied and cured for two minutes for a total exposure dose of about 1200 mJ/cm$^2$.

The thickness of the coating layers was determined using a microscope fitted with a micrometer scale. A mark was made on the surface of a coated sample. The wood surface was brought into the sharp focus of the microscope objective lens. The micrometer scale was set to zero. Then, the mark on the coating surface was brought into sharp focus, and the reading from the micrometer scale recorded.

Abrasion wear through resistance was determined using the following procedure. 100×100 mm pieces were cut from the coated boards. Test pieces were mounted on a specimen holder situated on a rotary table that, when energized, rotated at a constant speed of 50 revolutions per minute. Two 52 mm diameter metallic abrasive discs were covered with S-42 strips. The discs were fastened to a hinged rod designed to place a pressing force of 500 grams per disc onto the rotary table. The disc pivot arms were lowered onto the mounted sample. The device was energized; a revolution counter kept track of the number of cycles. The S-42 strips were new at the start of testing of each sample, cleaned with a brush after every 100 revolutions, and replaced after every 500 cycles. During the test, the specimen was visually inspected. The test was complete when the abrasive strip wore through the coating to initial exposure of bare wood. The number of cycles to wear through were noted. Wear through abrasion is reported in Tables 5 through 12 as the average cycles to wear per mil of coating and is the average of at least two test specimens.

TABLE 5

| Sample | Alumina | Treatment | Grams added to 100 g Coating B | Silica | Treatment | Grams added to 100 g Coating B | Abrasion cycles/mil |
|---|---|---|---|---|---|---|---|
| 13 | DURALUM 400 | — | 20.0 | — | — | — | 610 |
| 14 | DURALUM 400 | SiMAC | 20.0 | DK100 | SiMAC | 1.7 | 970 |
| 15 | DURALUM 400 | SiMAC | 5.0 | DK100 | SiMAC | 1.7 | 630 |
| 16 | DURALUM 400 | SiAC | 5.0 | DK100 | SiAC | 1.7 | 700 |
| 17 | DURALUM 400 | SiAC | 5.0 | DK100 | SiMAC | 1.7 | 670 |
| 18 | DURALUM 400 | SiMAC | 5.0 | VN3 | SiMAC | 1.7 | 570 |
| 19 | DURALUM 400 | SiAC | 5.0 | VN3 | SiMAC | 1.7 | 580 |
| 20 | DURALUM 320 | — | 20.0 | — | — | — | 970 |
| 21 | DURALUM 320 | SiMAC | 20.0 | DK100 | SiMAC | 2.0 | 1430 |
| 22 | WCA 25 | — | 20.0 | — | — | — | 630 |
| 23 | WCA 25 | SiMAC | 18.0 | DK100 | SiMAC | 2.0 | 665 |

As can be seen in Table 5, the use of treated alumina in conjunction with the treated silica (Sample 14) gave much better wear resistance than untreated alumina alone (Sample 8). Samples 15 through 19, all of which used a treated alumina and a treated silica gave results comparable to those achieved with Sample 8; significantly, the total weight percent of particle used in Samples 15 through 19 was 6.7 weight percent as compared with 20 weight percent of particle used in Sample 8. This demonstrates the ability of the present invention to greatly reduce the weight percent of particle without compromising performance.

Sample 21 demonstrates that use of the present treated particles gives much better results than use of untreated particles in a similar concentration (Sample 20). Improvement was also seen for the platelet-shaped alumina (Sample 22 vs. Sample 23) although the improvement was not as dramatic.

TABLE 6

| Sample | Alumina | Treatment | Grams added to 100 g Coating B | Silica | Treatment | Grams added to 100 g Coating B | Abrasion cycles/mil |
|---|---|---|---|---|---|---|---|
| 24* | WCA-25 | — | 20.0 | — | — | — | 665 |
| 25* | WCA-25 | SiMAC | 5.0 | DK100 | SiMAC | 1.7 | 675 |

*Substrate was oak.

Samples 24 and 25 demonstrate the comparable abrasion resistance for a 20 percent loading of an unmodified platelet alumina as compared to a 5 percent loading of a modified alumina together with modified silica. This again demonstrates the ability of the present particle combination to allow for reduced particle loading without sacrificing performance.

TABLE 7

| Sample | Alumina | Treatment | Grams added to 100 g Coating B | Silica | Treatment | Grams added to 100 g Coating B | Abrasion cycles/mil |
|---|---|---|---|---|---|---|---|
| 26 | DURALUM 400 | SiMAC | 2.0 | DK100 | SiMAC | 1.7 | 550 |
| 27 | DURALUM 400 | SiMAC | 2.5 | DK100 | SiMAC | 1.7 | 605 |
| 28 | DURALUM 400 | SiMAC | 5.0 | DK100 | SiMAC | 1.7 | 625 |
| 29 | DURALUM 400 | SiMAC | 20.0 | DK100 | SiMAC | 1.7 | 970 |

Samples 26 through 29 demonstrate that increased alumina loading increases abrasion resistance; comparable resistance was seen with alumina concentrations of 5.0 weight percent (Sample 28) and 2.5 weight percent (Sample 27).

Samples 38 through 41 demonstrate abrasion resistance of a ladder of silane modification on fumed silica. Samples according to the present invention (Samples 39 through 41) showed improved abrasion resistance over Sample 38 comprising modified alumina alone. Abrasion resistance did not necessarily increase with silane concentration, however.

TABLE 8

| Sample | Alumina | Treatment | Grams added to 100 g Coating B | Silica | Treatment | Grams added to 100 g Coating B | Abrasion cycles/mil |
|---|---|---|---|---|---|---|---|
| 30 | DURALUM 400 | 2% SiMAC | 5.0 | DK100 | 7% SiMAC | 1.7 | 650 |
| 31 | DURALUM 400 | 2% SiAC | 5.0 | DK100 | 7% SiAC | 1.7 | 660 |
| 32 | DURALUM 400 | 2% MTES | 5.0 | DK100 | 7% MTES | 1.7 | 640 |
| 33 | DURALUM 400 | 2% OTES | 5.0 | DK100 | 7% OTES | 1.7 | 580 |

As shown in Table 8, minerals treated with a number of different silanes all give good abrasion resistance.

TABLE 9

| Sample | Alumina | Treatment | Grams added to 100 g Coating B | Silica | Treatment | Grams added to 100 g Coating B | Abrasion cycles/mil |
|---|---|---|---|---|---|---|---|
| 34 | DURALUM 400 | — | 5.0 | DK100 | 7% SiMAC | 1.7 | 455 |
| 35 | DURALUM 400 | 2% SiMAC | 5.0 | DK100 | 7% SiMAC | 1.7 | 625 |
| 36 | DURALUM 400 | 5% SiMAC | 5.0 | DK100 | 7% SiMAC | 1.7 | 690 |
| 37 | DURALUM 400 | 8% SiMAC | 5.0 | DK100 | 7% SiMAC | 1.7 | 900 |

Samples 34 through 37 demonstrate the abrasion resistance for a ladder of silane modification levels of alumina at 5 percent alumina loading. Increased silane modification of alumina resulted in increased abrasion resistance.

TABLE 10

| Sample | Alumina | Treatment | Grams added to 100 g Coating B | Silica | Treatment | Grams added to 100 g Coating B | Abrasion cycles/mil |
|---|---|---|---|---|---|---|---|
| 38 | DURALUM 400 | 2% SiMAC | 5 | DK100 | — | — | 435 |
| 39 | DURALUM 400 | 2% SiMAC | 5 | DK100 | 0.5% SiMAC | 1.7 | 700 |
| 40 | DURALUM 400 | 2% SiMAC | 5 | DK100 | 3.5% SiMAC | 1.7 | 620 |
| 41 | DURALUM 400 | 2% SiMAC | 5 | DK100 | 7% SiMAC | 1.7 | 626 |

TABLE 11

| Sample | Alumina | Treatment | Grams added to 100 g Coating B | Silica | Treatment | Grams added to 100 g Coating B | Abrasion cycles/mil |
|---|---|---|---|---|---|---|---|
| 42 | DURALUM 320 | 2% SiMAC | 20.0 | DK100 | 7% SiMAC | 1.0 | 1370 |
| 43 | DURALUM 320 | 2% SiMAC | 20.0 | DK100 | 7% SiMAC | 1.5 | 1555 |
| 44 | DURALUM 400 | 8% SiMAC | 5 | OX50 | 3.5% SiMAC | 1.7 | 1005 |
| 45 | DURALUM 400 | 8% SiMAC | 5 | OX50 | 3.5% SiMAC | 3 | 1030 |

Samples 42 through 45 demonstrate abrasion resistance for a ladder of silica levels. Samples 42 and 43 compare 1 and 1.5 percent silica in the same system while Samples 44 and 45 compare 1.7 and 3 percent silica in the system. Increased abrasion resistance was observed when the amount of silica was increased.

TABLE 12

| Sample | Alumina | Treatment | Grams added to 100 g Coating B | Silica | Treatment | Grams added to 100 g Coating B | Abrasion cycles/mil |
|---|---|---|---|---|---|---|---|
| 46 | DURALUM 400 | 2% SiMAC | 5.0 | DK100 | 7% SiMAC | 1.7 | 625 |
| 47 | DURALUM 400 | 2% SiMAC | 5.0 | OX50 | 3.5% SiMAC | 1.7 | 640 |

Samples 46 and 47 demonstrate the abrasion resistance of two different surface area fumed silicas each modified with SiMAC at a level proportional to surface area of the silica. The surface area of DK100 is 100 m²/g while the surface area of AEROSIL OX50 is 50 m²/g. Results were comparable.

Example 5

Alumina and silica, when added, were stirred using propeller blade agitation into either Bona Tech Mega water-based floor coating, commercially available from BONA KEMI, or Bona Tech Traffic plus hardener water-based floor coating, also commercially available from BONA KEMI.

The modified alumina and silica were prepared as described in Examples 1 and 2.

Maple veneer boards were stained as generally described in Example 3. BONA KEMI coatings filled with mineral were drawn down on the stained wood using a square applicator bar (7 mil gap). Coatings were flashed for 90 minutes at 50° C. and then post-cured at room temperature for seven days.

Coating weights were determined by calculating the difference between the weight of a stained board and the weight of a coated board (after 90 minute flash at 50° C. then 10 minutes cooling at room temperature).

Abrasion wear through resistance was tested using the procedure described in Example 3. The number of cycles to wear through is reported in Table 13 as the average cycles to wear per gram of coating, and is average of at least two test specimens.

TABLE 13

| Sample | Coating | Alumina | Treatment | Grams added to 100 g Coating B | Silica | Treatment | Grams added to 100 g Coating B | Abrasion cycles/mil |
|---|---|---|---|---|---|---|---|---|
| 48 | Bona Tech Mega | DURALUM 400 | — | 20.0 | — | — | — | 155 |
| 49 | Bona Tech Mega | DURALUM 400 | SiAC | 5.0 | DK100 | SiAC | 1.7 | 130 |
| 50 | Bona Tech Traffic | DURALUM 400 | — | 20.0 | — | — | — | 245 |
| 51 | Bona Tech Traffic | DURALUM 400 | SiAC | 5.0 | DK100 | SiAC | 1.7 | 315 |

Samples 48 and 49 demonstrate the abrasion resistance of 20 percent alumina as compared to a combination of 5 percent modified alumina and 1.7 percent modified silica in a commercially available water-base flooring coating. Samples 50 and 51 provide the same filler comparisons in a second commercially available water-base flooring coating. In both cases, the particle combination of the present invention provided comparable results at greatly reduced loads.

Example 6

Compositions were made using the components and weight percents shown in Table 14. Components were added and mixed using Cowles blade agitation with sufficient speed to make a vortex and with agitation following for several minutes to disperse the particles in the coating.

TABLE 14

| Description | Coating A | Coating B |
|---|---|---|
| Urethane acrylate oligomer | 48.9 | 54.8 |
| n-Vinyl 2-pyrrolidone | 8.7 | 9.9 |
| Ditrimethylolpropane tetraacrylate | 14.3 | 16.0 |
| Tripropyleneglycol diacrylate | 4.5 | 5.4 |
| BYK 320 | 0.1 | |
| TEGO AIREX 920 | | 0.1 |
| Benzophenone | 0.8 | 0.9 |
| DAROCUR 1173 | 1.7 | 1.9 |
| CABOSIL M-5 | 0.5 | 0.5 |
| Cellulose acetate butyrate 551-0.1 | 0.4 | |
| WCA25TO[16] | 20.0 | |
| DURALUM special white 400 SK[17] | | 7.5 |
| LO-VEL 2003[18] | | 3.0 |

[16]WCA25TO, alumina from Micro Abrasives Corporation.
[17]DURALUM special white 400 SK, silane treated alumina from Washington Mills Electro Minerals Corporation.
[18]LO-VEL 2003, silica flatting agent from PPG Industries, Inc.

Mineral-filled coatings were applied to maple veneer boards that had been prepared as in Example 3. Mineral-filled coatings were applied as in Example 3 except that the coating was cured by exposure to 325 mJ/cm$^2$ using the lamps described above. Similarly, an additional 20 to 25 microns (0.8 to 1.0 mils) of the sample coating was applied, and the film build of coating was calculated. This coating was cured by exposure to 850 mJ/cm$^2$ also using the lamps described above.

Abrasion wear through resistance was tested using the following procedure. 4×4 inch pieces were cut from the wood sample prepared as described above. The pieces were mounted onto specimen holders of a Taber Industries abraser—Model 5150, which automatically counts cycles tested. Abrasion resistance measurements were made using CS-0 wheels covered with S-42 abrasive strips, both available from Taber Industries. A 500 gram load was placed on each wheel. The S-42 strips were new at the start of testing of each sample and were replaced after every 500 cycles. The Taber abraser was energized and the wood surface monitored. The test was complete when the abrasive strip had worn through the coating to initial exposure of bare wood. The number of cycles to wear through is reported in Table 2 as the average cycles to wear per mil of coating, and is the average of at least two test specimens.

Abrasive wear clarity was assessed using a similar procedure as above except that CS-17 wheels were used and the load on each wheel was 1000 grams. The CS-17 wheels were reconditioned against S-11 refacing discs for 50 cycles prior to each sample test. Abrasive wear clarity was evaluated for the samples after 100 cycles. Wear clarity was assessed visually and was defined as resistance to whitening. Visual comparisons of wear clarity listed in Table 2 are the average assessments of at least two specimens.

TABLE 15

| Coating | Coating A | Coating B |
|---|---|---|
| S-42 cycles to wear per mil | 440 | 430 |
| CS-17 100 cycle wear clarity | Whitened | Less whitened |

As can be seen from the results presented in Table 15, Coatings A and B had comparable performance in terms of S-42 abrasion resistance. The wear clarity of Coating B was improved as compared with Coating A, which contained almost double the loading of alumina. This demonstrates the improvement in wear clarity that is seen according to the present invention when reduced levels of particles are used; significantly, this wear clarity is achieved without sacrificing abrasion resistance.

Example 7

Coatings A and B, prepared as described in Example 6, were each drawn down on clear polycarbonate plaques (General Electric LEXAN) using a 2-mil gap side on a square applicator bar to transfer approximately 1 mil (25 microns) of coating to the polycarbonate. The coatings were cured by exposure to 900 mJ/cm$^2$ using lamps as described in Example 3 above.

Abrasive wear clarity was assessed after 100 cycles using CS-17 wheels and the procedure described in Example 6. Haze was measured using an XL-211 haze meter from Hazeguard Systems. Haze was measured in non-abraded and in abraded areas of each sample. The haze readings in Table 16 are the averages of at least two measurements.

TABLE 16

| Coating | Coating A | Coating B |
|---|---|---|
| Haze in non-abraded area | 33 | 8 |
| Haze after 100 cycles CS-17 wear | 65 | 47 |

As can be seen from the results presented in Table 16, Coating B has both less initial haze and less haze after CS-17 wear as compared with Coating A, which again has an almost double particle load.

Whereas particular embodiments of this invention have been described above for purposes of illustration, it will be evident to those skilled in the art that numerous variations of the details of the present invention may be made without departing from the invention as defined in the appended claims.

Therefore, we claim:

1. A wear-resistant coating composition comprising:
  (a) a binder;
  (b) alumina particles that have been treated with a silane having the formula (RO)$_3$SiR', wherein R is an alkyl moiety having 1 to 30 carbons, and R' is an organic moiety that improves the compatibility between the binder and the alumina particles; and
  (c) silica particles;
wherein up to 10 weight percent of the treated alumina is silane.

2. The coating of claim 1, wherein said silica is untreated.

3. The coating of claim 1, wherein said silica is treated with a silane having the formula (RO)$_3$SiR', wherein R is an alkyl moiety having 1 to 30 carbons and R' is an organic moiety that improves the compatibility between the binder and the silica, wherein the silane used to treat the silica is the same or different as the silane used to treat the alumina.

4. The coating of claim 1, wherein the alumina and silica together comprise 11.0 weight percent or less of the coating.

5. The coating of claim 4, wherein the alumina and silica together comprise 10.5 weight percent or less of the coating.

6. The coating composition of claim 1, wherein the binder is water-based.

7. The coating composition of claim 1, wherein the binder is UV curable.

8. The coating of claim 1, wherein the silane is 3-(trialkoxysilyl)alkyl (meth)acrylate.

9. The coating of claim 8, wherein the silane is 3-(trimethoxysilyl)propyl methacrylate.

10. The coating of claim 8, wherein the silane is 3-(trimethoxysilyl)propyl acrylate.

11. A method of imparting abrasion resistance to floorings, comprising applying to at least a portion of said flooring the composition of claim 1.

12. Wood flooring to which has been applied the composition of claim 1.

13. Vinyl flooring to which has been applied the composition of claim 1.

14. A method of imparting abrasion resistance to a substrate, comprising applying to at least a portion of said substrate the composition of claim 1.

15. A coating composition having an average wear clarity of less than 54 after 100 cycles of abrasive wheel wear testing.

16. The coating of claim 15, wherein the wear clarity is 50 or less.

17. The coating of claim 15, wherein said coating comprises:
  (a) a binder;
  (b) alumina particles that have been treated with a silane having the formula $(RO)_3SiR'$, wherein R is an alkyl moiety having 1 to 30 carbons, and R' is an organic moiety that improves the compatibility between the binder and the alumina particles; and
  (c) silica particles.

18. The coating of claim 17, wherein up to 10 weight percent of the treated alumina is silane.

19. The coating of claim 17, wherein said coating comprises 11 weight percent or less of said alumina particles and said silica particles.

20. A method of imparting wear clarity to a substrate, comprising applying to at least a portion of said substrate the composition of claim 15.

21. The coating composition of claim 1, wherein the alumina particles have an average particle size of 17 to 25 microns.

* * * * *